UNITED STATES PATENT OFFICE.

HERMAN GASSER, OF PLATTEVILLE, WISCONSIN.

COMPOUND FOR REMOVING PAINT.

SPECIFICATION forming part of Letters Patent No. 242,298, dated May 31, 1881.

Application filed December 24, 1880. (No specimens.)

*To all whom it may concern:*

Be it known that I, HERMAN GASSER, of Platteville, Grant county, Wisconsin, have invented a new and Improved Compound for Removing Paint, of which the following is a specification.

The object of my invention is to provide for the use of painters or others a solvent compound for softening or dissolving old or hardened paint preparatory to washing off or removing the same from glass, wood, or other surfaces to which it may have been applied; and the aim of my invention is to supply a compound of this kind which shall be both cheap and effective and possess such consistency as to remain on the space where applied without spreading or running over other parts not desired to be erased.

To this end my invention may be briefly stated to consist in a compound formed of a solution of a caustic alkali with a gelatinous solution of starch, whereby the above-named objects are attained, as hereinafter fully set forth.

To make my improved paint-solvent I take six pounds of carbonate of soda and six pounds of carbonate of lime and dissolve the same in six gallons of boiling water. After this solution has cooled I filter the same and again heat it to the boiling-point or thereabout, and I add thereto an agitated mixture of raw starch and water sufficient to bring the whole mass to a gelatinous consistency. The mixture may now be filled into suitable packages before or after it has cooled, and is then ready for sale or use.

The alkali in this compound of course acts as the solvent of the paint, while the starch simply serves to give the solution a thick body or gelatinous consistency. This consistency renders it much more convenient to use, and more efficient than would be the case with a free-flowing liquid, as the gelatinous material may be smeared by a brush, stick, knife, or almost any implement over the desired surfaces or portions of surfaces, and the compound will remain where so applied without overrunning other parts, which is a very desirable quality. It may thus be readily applied to the panes of a window to remove the paint or lettering from the glass without danger of its running or flowing onto the paint of the sash, and in many other cases its advantages become important.

The starch as a body or thickening has great advantages over any other material that can be used—first, on account of its cheapness, and, second, in its gelatinous properties, so that a very little added to the alkaline solution gives it the required consistency, whereas it would require a large mass of non gelatinous material to obtain the same consistency, which would at the same time greatly weaken the detersive quality of the alkaline solution, whereas the addition of starch does not apparently affect the detersive quality. The starch, moreover, has the additional advantage of transparency, which enables the paint to be observed through a film of the compound, so that the compound may be applied thereto with more accuracy, and the condition of the paint, when sufficiently dissolved for removal, may be easily seen.

In lieu of carbonate of lime caustic lime may be used, and in lieu of carbonate of soda any other caustic alkali may be used; but the carbonate of soda is preferred.

What I claim is—

A compound for removing paint, consisting of a solution of pure caustic soda and starch, the former brought to the boiling-point before the starch is added, as described.

HERMAN GASSER.

Witnesses:
T. L. CLEARY,
J. H. SPINK.